United States Patent
Alshaykh et al.

(10) Patent No.: US 9,661,383 B2
(45) Date of Patent: May 23, 2017

(54) SYSTEM AND METHOD FOR RECEIVING BROADCAST MULTIMEDIA ON A MOBILE DEVICE

(75) Inventors: Osama Alshaykh, San Diego, CA (US); Chris Johnson, Chicago, IL (US); Steven K. Rossi, Schaumburg, IL (US); Nitin Sonawane, Littleton, MA (US); James J. Kosmach, Geneva, IL (US); Richard June, Groton, MA (US)

(73) Assignee: III Holdings 2, LLC, Wilmington, DE (US)

(*) Notice: Subject to any disclaimer, the term of this patent is extended or adjusted under 35 U.S.C. 154(b) by 1060 days.

(21) Appl. No.: 12/284,948

(22) Filed: Sep. 26, 2008

(65) Prior Publication Data

US 2009/0083803 A1  Mar. 26, 2009

Related U.S. Application Data

(60) Provisional application No. 60/995,292, filed on Sep. 26, 2007.

(51) Int. Cl.
*H04N 21/4402* (2011.01)
*H04N 21/41* (2011.01)
*H04N 21/436* (2011.01)
*H04N 21/4363* (2011.01)

(52) U.S. Cl.
CPC ..... *H04N 21/4402* (2013.01); *H04N 21/4126* (2013.01); *H04N 21/43615* (2013.01); *H04N 21/43637* (2013.01)

(58) Field of Classification Search
None
See application file for complete search history.

(56) References Cited

U.S. PATENT DOCUMENTS

| | | | | |
|---|---|---|---|---|
| 5,937,038 | A * | 8/1999 | Bell et al. | 379/93.17 |
| 6,675,385 | B1 | 1/2004 | Wang | |
| 2001/0030959 | A1 * | 10/2001 | Ozawa et al. | 370/386 |
| 2003/0072257 | A1 * | 4/2003 | Ikedo et al. | 370/208 |
| 2003/0078061 | A1 | 4/2003 | Kim | |

(Continued)

FOREIGN PATENT DOCUMENTS

| | | |
|---|---|---|
| EP | 1511296 | 3/2005 |
| EP | 1657857 | 5/2006 |

(Continued)

OTHER PUBLICATIONS

Intl. Search Report, Dec. 10, 2008, PacketVideo Corp.

(Continued)

*Primary Examiner* — Omar S Parra
(74) *Attorney, Agent, or Firm* — McAndrews, Held and Malloy, LTD

(57) ABSTRACT

A system and a method receive broadcast multimedia on a mobile device. The system and the method may use a broadcast receiver accessory that may connect to a mobile device. The system and the method may have a bidirectional data connection between the broadcast receiver accessory and the mobile device. The broadcast receiver accessory may translate, reformat and/or repackage content into a form that may be viewed on the mobile device. The broadcast receiver accessory may have a tuner component, an application processor, an audio rendering element and/or memory.

26 Claims, 2 Drawing Sheets

(56) References Cited

U.S. PATENT DOCUMENTS

| | | | |
|---|---|---|---|
| 2003/0204845 A1* | 10/2003 | Sibley | H04N 7/163 725/25 |
| 2005/0047448 A1 | 3/2005 | Lee et al. | |
| 2005/0125830 A1 | 6/2005 | Halttunen et al. | |
| 2006/0031889 A1 | 2/2006 | Bennett et al. | |
| 2006/0117379 A1 | 6/2006 | Bennett et al. | |
| 2006/0172760 A1 | 8/2006 | Toyama et al. | |
| 2007/0049333 A1 | 3/2007 | Jeong et al. | |
| 2007/0056017 A1* | 3/2007 | Takatori | 725/151 |
| 2007/0093275 A1* | 4/2007 | Bloebaum et al. | 455/566 |
| 2007/0135038 A1 | 6/2007 | Peele | |
| 2007/0171601 A1* | 7/2007 | Bloebaum | 361/658 |
| 2007/0199024 A1* | 8/2007 | Noh et al. | 725/46 |
| 2007/0207813 A1* | 9/2007 | Fourquin et al. | 455/454 |
| 2007/0234387 A1* | 10/2007 | You | 725/39 |
| 2008/0004052 A1* | 1/2008 | Bloebaum et al. | 455/466 |
| 2008/0022003 A1* | 1/2008 | Alve | 709/229 |
| 2008/0052753 A1* | 2/2008 | Huang et al. | 725/151 |
| 2009/0069052 A1* | 3/2009 | Jain et al. | 455/558 |
| 2009/0193452 A1* | 7/2009 | Russ et al. | 725/31 |
| 2011/0083141 A1* | 4/2011 | Westberg et al. | 725/31 |

FOREIGN PATENT DOCUMENTS

| | | |
|---|---|---|
| EP | 1748583 | 1/2007 |
| EP | 1748649 | 1/2007 |
| GB | 2410160 | 7/2005 |
| JP | 2007020190 | 1/2007 |
| JP | 2007043700 | 2/2007 |
| WO | WO 2009/042195 | 4/2009 |

OTHER PUBLICATIONS

Intl. Written Opinion, Dec. 10, 2008, PacketVideo Corp.
European Office Action for Application No. 08834566.5, dated Jul. 20, 2015, 7 pages.

\* cited by examiner

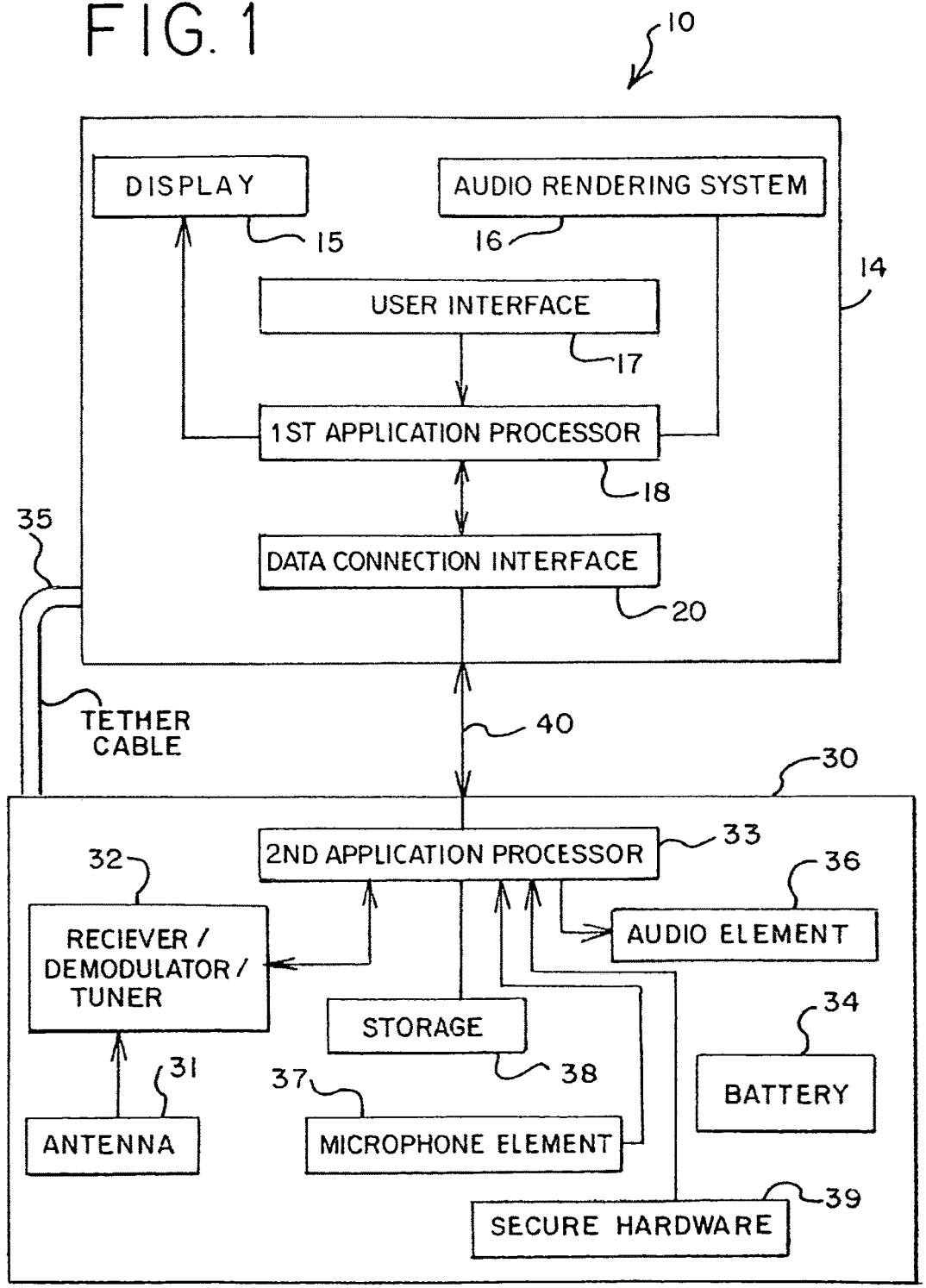

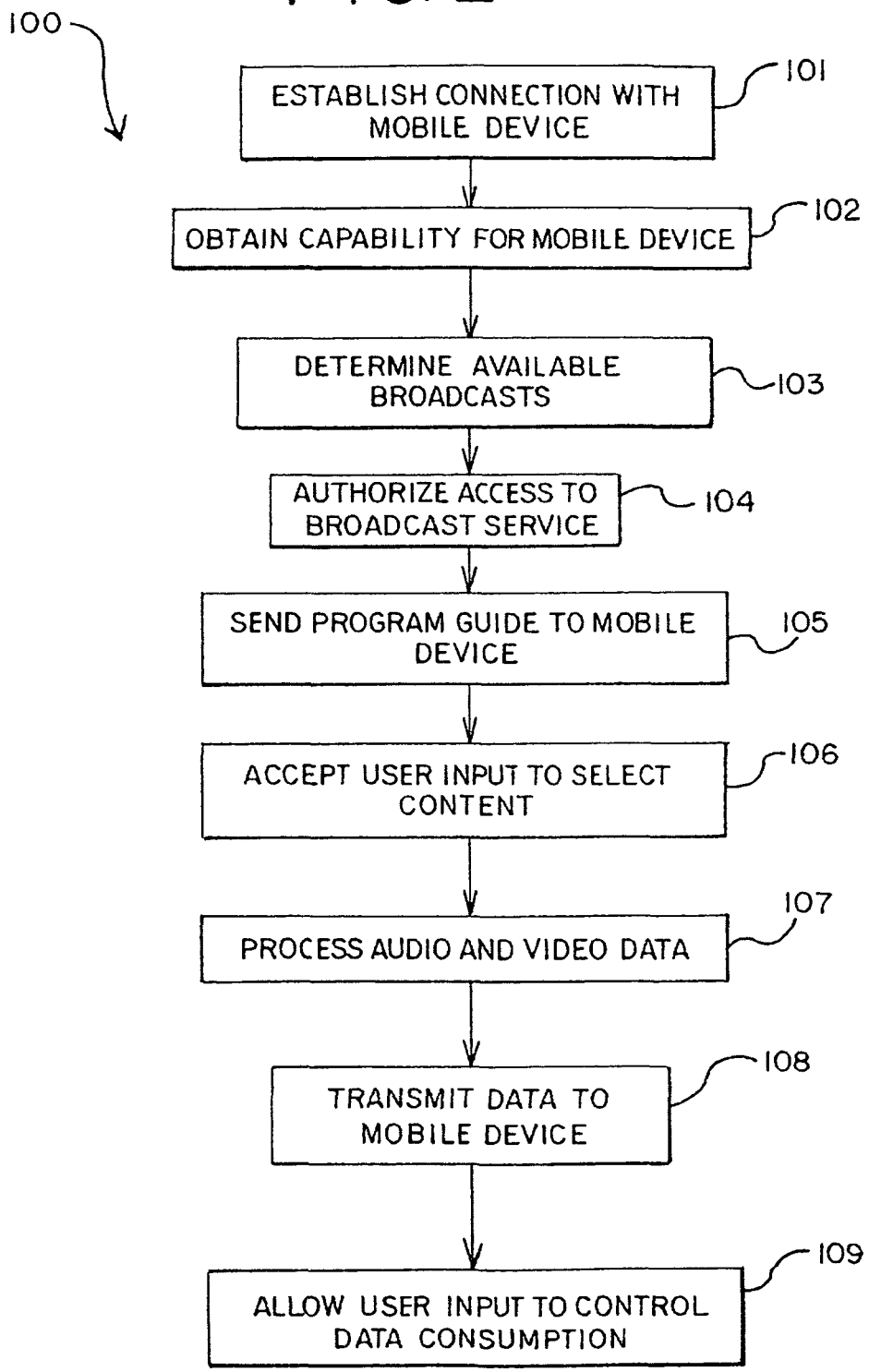

SYSTEM AND METHOD FOR RECEIVING BROADCAST MULTIMEDIA ON A MOBILE DEVICE

This application claims the benefit of U.S. Provisional Application Ser. No. 60/995,292 filed Sep. 26, 2007.

BACKGROUND OF THE INVENTION

The present invention generally relates to a system and a method for receiving broadcast multimedia on a mobile device. More specifically, the present invention relates to a system and a method for receiving broadcast multimedia on a mobile device that may use a broadcast receiver accessory that may connect to a mobile device. Further, the system and the method for receiving broadcast multimedia on a mobile device may have a bidirectional data connection between the broadcast receiver accessory and the mobile device. Still further, the system and the method for receiving broadcast multimedia on a mobile device may have a broadcast receiver accessory that translates, reformats and/or repackages content into a form that may be viewed on the mobile device. Moreover, the system and the method for receiving broadcast multimedia on a mobile device may have a broadcast receiver accessory that has a tuner component, an application processor, an audio rendering element and/or memory.

Various known devices transmit digital audiovisual broadcast signals to mobile phones and/or other portable digital receivers. Technology may be standardized, proprietary and/or a combination of standardized and proprietary. Some known examples are the mobile broadcasting standards DVB-H (Digital Video Broadcasting-Handheld), DMB (Digital Media Broadcasting), tdTV (trademark of IPWireless, Inc.), MediaFLO (trademark of Qualcomm, Inc.), OMA BCAST (trademark of Open Mobile Alliance, Inc.) and 3GPP Multimedia Broadcast Multicast Service ("3GPP MBMS"). A common broadcast signal is used to deliver digitally encoded audiovisual content to many receiver devices. The receiver devices may be, for example, a mobile phone, a PDA, a dedicated mobile television receiver or another mobile device capable of receiving and displaying a mobile broadcast signal.

Digitally encoded audiovisual content is delivered to self-contained devices that incorporate the mobile broadcast receiver hardware, the application processor, the audio and video decoders and rendering systems, the display screen and the user interface in a single device. An example of such a self-contained device is a mobile phone with an integrated mobile broadcast receiver.

Mobile broadcast service using self-contained devices has numerous disadvantages. Mobile phone subscribers typically sign one or two year contracts with a mobile operator and often pay a penalty for early termination. Thus, users of self-contained devices cannot upgrade to a new broadcast-capable phone until their contract ends which slows the purchase of a newly launched service. Mobile phone subscribers may have other reasons to not upgrade their phones as well, such as, for example, the loss of applications, media, contacts and other customized applications on their current phone if the user subscribes to a new phone. These users may be reluctant to sign up for a broadcast service which requires an upgrade to a phone that is not compatible with their current media and other customized applications.

Furthermore, a user may prefer a particular phone design which does not support the particular mobile broadcast technology for the broadcast service to which the user desires to subscribe. Separation of the mobile phone from the broadcast receiver functionality provides the advantage of allowing the user to use the particular phone design and the particular broadcast service to which the user desires to subscribe.

A self-contained device often prohibits the user from switching broadcast services without switching phones. Thus, the user loses the original investment into a broadcast-enabled phone if the user switches broadcast services. For example, a user may sign up for a first mobile broadcast service and acquires a compatible phone. The user may later develop a preference for content offered on a second mobile broadcast service. However, switching to the second mobile broadcast service by ending the original service contract and replacing the original phone may be expensive.

Self-integrated devices unnecessarily tie the broadcast services to a mobile operator. The mobile operator subsidizes the mobile phone device; therefore, the service contract associated with the self-integrated device ties the user to a contract for both a particular mobile network and a particular broadcast service. Separation of the mobile broadcast function from the mobile phone provider allows the user to change either his mobile phone operator or his broadcast provider independently if he is dissatisfied with one or the other. The quality of the broadcast service may retain users even if the user changes the mobile phone operator, providing an advantage for the broadcast provider. Furthermore, the broadcast provider is encouraged to maintain quality broadcast service because users are not prevented from switching mobile broadcast service due to their mobile phone service contract.

The above problems may appear to be solved by addition of an external antenna and a receiver/tuner/demodulator unit to an existing mobile phone or other device that lacks broadcast reception capabilities. However, this approach fails because many existing multimedia phones do not have processing power, display resolution and/or specific audio-visual decoder elements necessary to process and display full quality audiovisual content typically carried on a mobile broadcast service.

A need, therefore, exists for a system and a method for receiving broadcast multimedia on mobile devices. Further, a need exists for a system and a method for receiving broadcast multimedia on a mobile device that use a broadcast receiver accessory that connects to a mobile device. Still further, a need exists for a system and a method for receiving broadcast multimedia on a mobile device that have a bidirectional data connection between the broadcast receiver accessory and the mobile rendering device. Still further, a need exists for a system and a method for receiving broadcast multimedia on a mobile device that have a broadcast receiver accessory that translates, reformats and/or repackages content into a form that may be viewed on the mobile rendering device. Moreover, a need exists for a system and a method for receiving broadcast multimedia on a mobile device that have a broadcast receiver accessory that has a tuner component, an application processor, an audio rendering element and/or memory.

SUMMARY OF THE INVENTION

The present invention generally relates to a system and a method for receiving broadcast multimedia on a mobile device. More specifically, the present invention relates to a system and a method for receiving broadcast multimedia on a mobile device that may use a broadcast receiver accessory that connects to a mobile device. Further, the system and the method for receiving broadcast multimedia on a mobile device may have a bidirectional data connection between the broadcast receiver accessory and the mobile rendering device. Still further, the system and the method for receiving broadcast multimedia on a mobile device may have a broadcast receiver accessory that translates, reformats and/or repackages content into a form that may be viewed on the mobile rendering device. Moreover, the system and the method for receiving broadcast multimedia on a mobile device may have a broadcast receiver accessory that has a tuner component, an application processor, an audio rendering element and/or memory.

It is, therefore, an advantage of the present invention to provide a system and a method for receiving broadcast multimedia on a mobile device.

Another advantage of the present invention is to provide a system and a method for receiving broadcast multimedia on a mobile device that have a bidirectional data connection between the broadcast receiver accessory and the mobile rendering device.

And, another advantage of the present invention is to provide a system and a method for receiving broadcast multimedia on a mobile device that have a broadcast receiver accessory that connects to a mobile rendering device.

Yet another advantage of the present invention is to provide a system and a method for receiving broadcast multimedia on a mobile device that have a broadcast receiver accessory that translates, reformats and/or repackages content into a form that may be viewed on the mobile rendering device.

Further, an advantage of the present invention is to provide a system and a method for receiving broadcast multimedia on a mobile device that have a broadcast receiver accessory that has a tuner component, an application processor and/or memory.

Still further, an advantage of the present invention is to provide a system and a method for receiving broadcast multimedia on a mobile device that allow a user to have a mobile broadcast service separate from a mobile phone service.

Yet another advantage of the present invention is to provide a system and a method for receiving broadcast multimedia on a mobile device that utilize a standard data connection to provide mobile broadcast capability to a mobile device.

Still further, an advantage of the present invention is to provide a system and a method for receiving broadcast multimedia on a mobile device that has a mobile broadcast accessory that has direct audio rendering via an audio rendering element.

Moreover, an advantage of the present invention is to provide a system and a method for receiving broadcast multimedia on a mobile device that supports multiple broadcast subscriptions.

Additional features and advantages of the present invention are described in, and will be apparent from, the detailed description of the presently preferred embodiments and from the drawings.

BRIEF DESCRIPTION OF THE DRAWINGS

FIG. 1 illustrates a system for receiving broadcast multimedia on a mobile device in an embodiment of the present invention.

FIG. 2 illustrates a flowchart of a method for receiving broadcast multimedia on a mobile device in an embodiment of the present invention.

DETAILED DESCRIPTION OF THE PREFERRED EMBODIMENTS

The present invention generally relates to a system and a method for receiving broadcast multimedia on a mobile device. More specifically, the present invention relates to a system and a method for receiving broadcast multimedia on a mobile device that may use a broadcast receiver accessory that may connect to a mobile device. Further, the system and the method for receiving broadcast multimedia on a mobile device may have a bidirectional data connection between the broadcast receiver accessory and the mobile device. Still further, the system and the method for receiving broadcast multimedia on a mobile device may have a broadcast receiver accessory that translates, reformats and/or repackages content into a form that may be viewed on the mobile device. Moreover, the system and the method for receiving broadcast multimedia on a mobile device may have a broadcast receiver accessory that has a tuner component, an application processor, an audio rendering element and/or memory.

Referring now to the drawings wherein like numerals refer to like parts, FIG. 1 illustrates a system 10 which may have a mobile device 14. The mobile device 14 may be, for example, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a satellite radio receiver, a portable digital audio player, a portable digital video player and/or the like. The mobile device 14 may be any mobile device that has the capability to display video but may not have the capability to receive a specific mobile broadcast service. The mobile device 14 may not have an antenna, receiver hardware, a demodulator and/or a tuner that may be necessary to receive and/or to utilize a broadcast signal. Therefore, the mobile device 14 may not be capable of processing and/or rendering full quality audiovisual content present in the broadcast signal; for example, the mobile device 14 may not be able to decode and/or to render the full quality content and/or may not be able to display full resolution of a video portion of the content of the broadcast signal.

The mobile device 14 may have a display 15 for viewing, for consuming and/or for displaying the multimedia. The mobile device 14 may have an audio rendering system 16 having one or more speakers and/or a jack for headphones. A user interface 17 on the mobile device 14, such as, for example, buttons, a touchpad, a touchscreen and/or a trackball, may allow a user to provide input to the mobile device 14.

The mobile device 14 may have a data connection interface 20 for communication with a broadcast receiver accessory 30. The data connection interface 20 may be, for example, a Universal Serial Bus ("USB"), a Bluetooth (trademark of Bluetooth, Inc.) wireless connection, a wireless connection based on the IEEE 802.11 ("WiFi") standards, or the like. The current invention should not be limited by the specific realization of the data connection interface 20.

The broadcast receiver accessory 30 may receive the broadcast signal, may demodulate the broadcast signal to recover a digital transport stream which carries audiovisual content and/or program information, may transcode and/or repackage the audiovisual content into a format appropriate for the mobile device 14, and/or may provide the audiovisual content and the program information to the mobile device 14.

The mobile device 14 may have a software application that interacts with the broadcast receiver accessory 30 via a data connection 40. The data connection 40 may be controlled by the data connection interface 20. The software application may interact with the mobile device 14 and/or may receive input from the user interface 17. The software application may allow the user to browse the content and/or associated metadata in an electronic program guide, select audiovisual content for consumption, consume the selected audiovisual content, switch broadcast channels and/or record the selected audiovisual content for later viewing.

The mobile device 14 may have a first application processor 18 that may execute the software application. In addition, the first application processor 18 may accept, process and/or render audio signals and video signals provided by the broadcast receiver accessory 30. The first application processor 18 may have associated hardware decoder accelerators (not shown) that may accelerate the processing and/or rendering of the audio signals and/or video signals.

The software application may be pre-installed on the mobile device 14. As a result, the mobile device 14 may have the software application when the mobile device 14 is purchased or otherwise acquired. Alternatively, the software application may be installed on the mobile device 14 subsequent to purchase, such as, for example, when the user subscribes to the broadcast service. The software application may be installed by the user and/or by a service technician, remotely or at an operator store location.

The software application may be written in JAVA programming language (trademark of Sun Microsystems, Inc.) or similar programming language. The software application may be a specific mobile variant of JAVA, such as J2ME, and/or may use JAVA standard multimedia interfaces, such as JSR-135, that may be available on the mobile device 14.

The broadcast receiver accessory 30 may receive the broadcast signal, may demodulate the broadcast signal to recover the digital transport stream which carries the audiovisual content and the program information and/or may provide the audiovisual content and the program information to the mobile device 14. The broadcast receiver accessory 30 may have an antenna 31 and/or a receiver/demodulator/tuner 32. The antenna 31 may be connected to the receiver/demodulator/tuner 32. Output from the receiver/demodulator/tuner 32 may be a digital transport stream. The digital transport stream may carry a multiplex that may be a simultaneous transmission of two or more trains of signals or messages over a single channel. The multiplex may have compressed audio and/or visual bitstreams, synchronization and timing information and/or program guide information.

The receiver/demodulator/tuner 32 may provide the compressed audio and video bitstreams, the synchronization and/or the timing information and the program guide information to the second application processor 33. The broadcast receiver accessory 30 may have multiple receiver/demodulator/tuners 32 to simultaneously support multiple broadcast technologies from different broadcast services. Alternatively, the broadcast receiver accessory 30 may have a multipurpose receiver/demodulator/tuner 32 that may simultaneously support the multiple broadcast technologies from different broadcast services. The user may be offered a combination of content from the multiple broadcast technologies and/or may switch between the different broadcast services.

The broadcast receiver accessory 30 may have a second application processor 33. The second application processor 33 may connect to the receiver/demodulator/tuner 32. The second application processor 33 may configure the receiver/demodulator/tuner 32, such as, for example, setting a frequency of the receiver/demodulator/tuner 32 and/or selecting a particular digital transport stream from available digital transport streams. Thus, the connection of the second application processor 33 with the receiver/demodulator/tuner 32 may be bidirectional. The second application processor 33 may exchange capability information with the software application running on the mobile device 14 to determine a content format, audio and visual codecs, content encoding parameters and/or similar capabilities supported by the mobile device 14.

The second application processor 33 may provide the audiovisual content and/or the program guide information to the mobile device 14 via the data connection 40. The second application processor may receive content selection information from the mobile device 14 via the data connection 40 and may allow the user to select the audiovisual content for viewing. The second application processor 33 may adjust, transcode and/or transform the content received from the broadcast signal to match capabilities of the mobile device 14. If the mobile device 14 is capable of accepting the broadcast signal without transformation, then the second application processor 33 may transfer the content to the mobile device 14 without transcoding.

The audiovisual content may be encrypted. The second application processor 33 may perform decryption of the audiovisual content. The broadcast receiver accessory 30 may have a key management system that stores keys necessary for the decryption of the audiovisual content. The broadcast receiver accessory 30 may have secure hardware 39 that may contain the key management system and, therefore, may prevent unauthorized access to some or all of the keys necessary to perform the decryption. The secure hardware 39 may be a SIM card, a smart card, a secure digital (SD) card and/or other secure hardware element known to one of ordinary skill in the art. The current invention should not be limited to a specific embodiment of the secure hardware 39.

The broadcast receiver accessory 30 may have a battery 34 to provide power. A battery charging mechanism (not shown) may also be provided. Alternatively, the broadcast receiver accessory 30 may obtain power from the mobile device 14 using a tether cable 35. The tether cable 35 may also carry the data connection 40. The broadcast receiver accessory 30 may have an audio rendering element 36. The audio rendering element 36 may provide an alternative rendering path. For example, the broadcast receiver accessory 30 may decode audio content received by the broadcast receiver accessory and render the audio content via the audio rendering element 36. The audio rendering element 36 may be connected to headphones and/or speakers through a wired connection, such as, for example, a headphone jack. Alternatively, the audio rendering element 36 may have a wireless connection, such as a Bluetooth connection. Video rendering may occur simultaneously to the audio rendering; for example, the audio rendering element 36 may render the audio content, and the mobile device 14 may render the video content.

A microphone element 37 may accept audio input. The microphone element 37 may act in conjunction with the audio rendering element 36 to provide a hands-free calling accessory. For example, the microphone element 37 and the audio rendering element 36 may allow the user to make outgoing calls and/or receive incoming calls using the broadcast receiver accessory 30. The microphone element 37 may be integrated with the broadcast receiver accessory 30. Alternatively, the microphone element 37 may be external to the broadcast receiver accessory and may communicate with the mobile broadcast accessory 30 via a wired connection or a wireless connection.

FIG. 2 generally illustrates a method 100 for receiving broadcast multimedia on a mobile device in an embodiment of the present invention. A connection may be initiated between the broadcast mobile accessory 30 and the mobile device 14 as shown at step 101. The connection may exchange capability information to set up the content format, the types of data and/or the encoding parameters to be used between the broadcast mobile accessory 30 and the mobile device 14 as shown at step 102. The mobile broadcast accessory 30 may determine the available broadcast services as shown at step 103. Service authorization and/or authentication information may be exchanged via the connection as shown at step 104. The service authorization and/or the authentication information may be transmitted from the mobile device 14 to the broadcast mobile accessory 30 to allow the mobile broadcast accessory 30 to access the broadcast service. The program guide information may be sent to the mobile device 14 via the connection as shown at step 105. The user may input content selection information as shown at step 106.

Selected audio and video bitstreams may be obtained from the digital transport stream that may be received. The digital transport stream may be parsed, audio and video substreams may be demultiplexed, and/or Digital Rights Management ("DRM") and associated decryption may be performed.

The audio and video data may be processed as shown at step 107. If the broadcast receiver accessory 30 has the audio rendering element 36 and/or is configured to render the audio, the received audio is decoded and/or transcoded for rendering on the audio rendering element 36. Rendering may involve direct rendering, such as to wired headphones, or may involve re-encoding of the audio and video data for transmission to Bluetooth headphones. If the broadcast receiver accessory 30 does not have an audio rendering element 36 or if the broadcast receiving device 30 is configured to render the audio via the mobile device 14, then the audio data may be decoded and/or transcoded to match the capabilities of the mobile device 14. The audio content may be sent to the mobile device 14 via the connection. The mobile broadcast accessory 30 may provide updates of the program guide information to the mobile device 14 as content availability changes.

The software application running on the mobile device 14 may communicate to the mobile broadcast accessory 30 the audio and video decoding and rendering capabilities of the mobile device 14. The audio and/or video bitstreams may be transmitted to the mobile device 14 in an unaltered form or may be transformed and/or transcoded to match the audio and video decoding and rendering capabilities of the mobile device 14. For example, if the audio bitstream delivered by the broadcast service is an aacPlus audio stream encoded at 32 kbps (kilobits per second) and the audio decoding capabilities expressed by the mobile device 14 do not include aacPlus audio decoding, the audio bitstream may be transcoded to a 48 kbps AAC audio bitstream before delivery to the mobile device 14. As a further example, if the video bitstream delivered by the broadcast service is an H.264 video stream encoded at 15 fps (frames per second) QVGA (Quarter Video Graphics Array) at 384 kbps (kilobits per second) and the video decoding capabilities expressed by the mobile device 14 do not include H.264 decoding or support for a QVGA display resolution, then the bitstream may be transcoded to an H.263 video bitstream at 15 fps QCIF (Quarter Common Intermediate Format) at 200 kbps. The resulting audio and/or video bitstream may then be sent to the mobile device 14 for decoding and/or for rendering as shown at step 108.

The mobile broadcast accessory 30 may establish a secure connection with the mobile device 14. Example technologies for the secure connection are Digital Transmission Content Protection ("DTCP"), Digital Rights Management by Secure Digital Container Corporation of Basle, Switzerland ("SDC DRM"), IP Security ("IPSec") and Transport Layer Security ("TLS"). The broadcast service provider may set security requirements that may determine a technology that may be used for the secure connection. The current invention should not be limited to a specific secure connection technology.

User input into the mobile device 14 may control consumption of the multimedia as shown at step 109. For example, the user may select new content, change the broadcast channels, end viewing and/or make other changes that may affect consumption of the multimedia. The mobile device 14 may send appropriate signals to the mobile broadcast accessory 30 via the connection to transmit the user input to the mobile broadcast accessory 30. The mobile broadcast accessory 30 may react to the user input by adjusting processing and/or transformation of the digital transport stream and/or configuration of the receiver/demodulator/tuner 32 to perform commands of the user input. Further, the software application may allow content to be recorded on the mobile device 14. The content may be placed in local storage 38 on the mobile device 14 and/or the mobile broadcast accessory 30 for later viewing.

The software application on the mobile device 14 may be custom software that may be designed specifically to interact with and/or control the broadcast receiver accessory 30. Alternatively, the software application may consist of and/or may have standard software components which may be capable of interacting with and/or controlling the broadcast receiver accessory 30 using well known standard protocols. For example, the software application on the mobile device 14 may have a standard web browser and/or media player which may interact with the broadcast receiver accessory 30 via the data connection 40 using standard web protocols and formats. In this example, the broadcast receiver accessory 30 may act as a web server. The broadcast receiver accessory 30 may allow the user of the mobile device 14 to browse the Electronic Program Guide in a standard web format such as HTML using a standard web browser on the mobile device 14. If content for viewing is selected, the mobile device 14 may request the content using a standard protocol such as RTSP or HTTP. The broadcast receiver accessory 30 then may deliver the audiovisual content to the mobile device 14 in the context of a standard RTSP or HTTP media session. The audiovisual content may be transferred to the mobile device 14 via the data connection 40 and/or may be decoded and rendered by a standard media player running on the mobile device 14. The content transcoding and/or repackaging function of the broadcast receiver accessory 30 may convert the Electronic Program Guide into a format viewable on a standard web browser. The content transcoding and/or repackaging function of the broadcast receiver accessory 30 may repackage the audiovisual content into a format such as Packetized RTP or a 3GPP Progressive Download file which may be suitable for delivery to the standard browser and media player components on the mobile device 14.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A mobile broadcast receiver accessory comprising:
   a key management system configured to store a key;
   a connector configured to connect the mobile broadcast receiver accessory to a mobile device;
   a housing configured to be connected to the mobile device via the connector;
   an antenna configured to receive a broadcast signal containing encrypted audiovisual content;
   a demodulator contained within the housing, wherein the demodulator is configured to:
      receive the broadcast signal from the antenna; and
      recover the encrypted audiovisual content from the broadcast signal;
   an application processor contained within the housing, wherein the application processor is configured to:
      receive the encrypted audiovisual content from the demodulator; and
      decrypt the encrypted audiovisual content using the key to form decrypted audiovisual content;
   a data connection configured to transport the decrypted audiovisual content to the mobile device;
   an audio rendering element configured to render an audio component of the broadcast signal substantially simultaneously to rendering of a video component of the broadcast signal on the mobile device to which the mobile broadcast receiver accessory is communicatively connected; and
   at least one of a speaker, a headphone jack, or a wireless connection connected to the audio rendering element.

2. The mobile broadcast receiver accessory of claim 1, wherein the application processor is further configured to convert multimedia in the broadcast signal from a first format to a second format, wherein the second format is different than the first format and further wherein the application processor is further configured to transmit the multimedia to the mobile device in the second format.

3. The mobile broadcast receiver accessory of claim 1, wherein the application processor is further configured to adjust a signal frequency received by the demodulator.

4. The mobile broadcast receiver accessory of claim 1, further comprising:
   a second demodulator connected to the antenna wherein the second demodulator is configured to process a second broadcast signal that is different than the broadcast signal, wherein the second broadcast signal is transmitted from a second broadcast service that is different than a broadcast service that transmits the broadcast signal, and wherein the second demodulator is integral with the housing.

5. The mobile broadcast receiver accessory of claim 1, wherein the demodulator processes a second broadcast signal wherein the second broadcast signal is transmitted from a second broadcast service, and further wherein the second broadcast signal is different than the broadcast signal, and further wherein the second broadcast service is different than a broadcast service that transmits the broadcast signal.

6. The mobile broadcast receiver accessory of claim 1, wherein the key management system comprises secure hardware connected to the application processor wherein the secure hardware stores the key.

7. The mobile broadcast receiver accessory of claim 1, further comprising:
   a tether cable having a first end and a second end wherein the tether cable provides the data connection and further wherein the first end of the tether cable is directly connected to the mobile device wherein the second end of the tether cable is directly connected to the housing.

8. The mobile broadcast receiver accessory of claim 1, wherein the data connection is a secure connection.

9. The mobile broadcast receiver accessory of claim 1, further comprising:
   a storage element connected to the application processor wherein multimedia from the broadcast signal is stored in the storage element and further wherein the multimedia is transmitted from the storage element to the mobile device via the data connection at a time subsequent to receipt of the broadcast signal.

10. The mobile broadcast receiver accessory of claim 1, wherein the wireless connection comprises a Bluetooth connection.

11. A method for rendering multimedia on a mobile device, the method comprising the steps of:
    determining broadcast services that are available wherein the broadcast services that are available are determined by a mobile receiver accessory communicatively connected to the mobile device and transported with the mobile device;
    transmitting a program guide from the mobile receiver accessory to the mobile device wherein the multimedia is listed in the program guide and further wherein the mobile device displays the program guide;
    receiving a first broadcast signal from a first broadcast service wherein the first broadcast service is one of the broadcast services that are available and further wherein the mobile receiver accessory receives the first broadcast signal from the first broadcast service wherein the multimedia is transmitted in the first broadcast signal from the first broadcast service in a first format;
    transmitting the multimedia from the mobile receiver accessory to the mobile device;
    rendering the multimedia on an audio rendering element of the mobile receiver accessory substantially simultaneously to rendering the video component of the multimedia on the mobile device; and
    providing rendered audio from the audio rendering element to a component on the mobile receiver accessory, wherein the component comprises at least one of a headphone jack, a speaker, or a wireless connection.

12. The method of claim 11, further comprising:
    converting the multimedia from the first format to a second format wherein the first format is different than the second format and further wherein the mobile receiver accessory converts the multimedia from the first format to the second format and transmits the multimedia in the second format to the mobile device.

13. The method of claim 11, further comprising:
    displaying a list of the broadcast services that are available wherein the mobile device displays the list in the program guide and further wherein the mobile receiver accessory receives the first broadcast signal in response to user input on the mobile device which selects the first broadcast service from the list.

14. The method of claim 11, further comprising:
storing the multimedia on the mobile receiver accessory.

15. The method of claim 11, further comprising:
rendering an audio component of the multimedia substantially simultaneously to rendering of a video component of the multimedia on the mobile device wherein the audio component of the multimedia is rendered on the mobile receiver accessory.

16. The method of claim 11, further comprising:
performing decryption of the multimedia wherein the mobile receiver accessory performs the decryption.

17. The method of claim 11, further comprising:
entering user input on a user interface of the mobile device to select the multimedia wherein selection of the multimedia on the mobile device initiates transmission of the multimedia from the mobile receiver accessory to the mobile device.

18. The method of claim 11, further comprising:
converting the program guide to an HTML format wherein the mobile receiver accessory converts the program guide to the HTML format before transmitting the program guide from the mobile receiver accessory to the mobile device as a webpage which is viewed in a web browser provided by the mobile device.

19. The method of claim 11, further comprising:
processing a second broadcast signal that is transmitted from a second broadcast service wherein the second broadcast service is one of the broadcast services that are available wherein the second broadcast signal is processed by the mobile receiver accessory and further wherein the second broadcast signal is different than the first broadcast signal and further wherein the second broadcast service is different than the first broadcast service.

20. The method of claim 11, wherein the program guide lists the multimedia from the first broadcast service and multimedia from a second broadcast service wherein the first broadcast service and the second broadcast service are different broadcast services.

21. The method of claim 11, further comprising:
conducting a telephone call by accepting audio input on a microphone element of the mobile receiver accessory communicatively connected to the mobile device and playing audio output on the mobile receiver accessory communicatively connected to the mobile device.

22. The method of claim 11, further comprising:
establishing a secure connection between the mobile receiver accessory and the mobile device wherein the multimedia is transmitted from the mobile receiver accessory to the mobile device using the secure connection.

23. The mobile broadcast receiver accessory of claim 1, wherein the data connection is a wireless connection.

24. The method of claim 11, wherein the multimedia is transmitted from the receiver accessory to the mobile device using a wireless connection.

25. The method of claim 11, further comprising:
determining whether the mobile device is authorized to receive multimedia content from the broadcast services that are available wherein the receiver accessory receives the first broadcast signal from the first broadcast service if the mobile device is authorized to receive the multimedia content from the first broadcast service.

26. The method of claim 11, wherein the mobile receiver accessory transmits the multimedia to the mobile device in one of an RTSP media session and an HTTP media session.

\* \* \* \* \*